Patented June 16, 1936

2,044,570

UNITED STATES PATENT OFFICE 2,044,570

METHOD OF PRODUCING AN EMULSIFIABLE ASPHALT

Charles E. Hite, Philadelphia, Pa.

No Drawing. Application February 17, 1934,
Serial No. 711,733

3 Claims. (Cl. 134—1)

The invention relates to a method of preparing a water-free emulsifiable asphalt. The object is to provide a compound of asphalt and a water-free or dehydrated emulsifying medium which shall form a stable mechanical mixture capable of producing an emulsion by the simple addition and thorough mixing of water to said mixture.

The advantages of said product are as follows:—

The compound may be manufactured at any place convenient to the supply of materials, especially the asphalt.

The compound, containing no water, may be shipped in bulk to any desired destination, without danger of the same freezing.

As no water is contained in the compound, the freight charges are reduced to a minimum.

The components of the compound are variable at will and adapted to produce emulsions of differing character.

The stable compound may be stored indefinitely, ready for use when needed by the simple addition and mixing of the necessary amount of water.

The emulsion produced from the compound will always be uniform and of maximum efficiency.

The time, labor and cost of producing the emulsion at the place of use is greatly reduced.

The product is adapted for a wide range of uses, for example, road paving, asphalt compositions containing aggregates for surface treatment, repair and patchwork, macadam pavements, asphaltic concrete pavements, asphalt mastic floorings, expansion joints, and dust-laying sprays, etc.

As an average, State specifications for road work specify an asphalt with a penetration of 50–60, and a melting point 115–125. I shall use such an asphalt in the examples cited herein, though, in practice, other asphalts, having different penetration and melting point tests, may be used in the preparation of emulsifiable asphalt.

In making the compound I add to the asphalt, a dispersing agent, comprising a water-free organic substance, either naturally, or otherwise dehydrated. This dispersing agent is intimately mixed with asphalt in the liquid state, thereby producing a stable mechanical mixture, without changing the chemical nature of any of the constituents.

Examples of organic substances, suitable to form a dispersing agent, are cereal flours, such as are made from corn, rye, barley, wheat, sage and tapioca; certain dehydrated pulverized sugars, such as black strap; and dehydrated oleaginous meals, finely powdered, such as those of flaxseed and soya beans.

Any one or two or more of these substances may be used to form the dispersing agent. While none of these dispersing agents, when mixed with asphalt change its chemical nature, they do improve the binding quality of the compound or of the emulsion formed therefrom.

In the manufacture of the product, the following is considered a preferred method:

I prepare an emulsifying medium by the thorough and rapid mixing together of a dispersing agent and an asphalt cut back, such as a light petroleum naphtha, in substantially equal proportions.

The purpose of the cut back is to secure or facilitate the distribution of the particles of the dispersing agent throughout the body of asphalt. Without the cut back such distribution would be exceedingly difficult, especially in view of the extremely small quantity (about three percent) used with a given body of asphalt, for the reason that the particles of the dry dispersing agent tends to cling together and form lumps in the mass. This lumpy condition is entirely obviated by mixing with the dispersing agent a light weight asphalt cut-back, before adding it to the asphalt.

The individual particles of the dispersing agent thereby become saturated with the cut-back, which enables the particles to move freely among themselves and also throughout the mass of asphalt, while being mixed therewith. Eventually the asphalt absorbs the cut-back, leaving in suspension each individual particle of the dispersing agent entirely free from the other particles. The particles do not agglomerate.

The presence of the dispersing agent tends to raise the melting point and increase the viscosity of the asphalt, so that a small quantity of cut-back is usually desirable to maintain or restore the melting point and viscosity within prescribed limits of the specifications.

Having thus prepared an adequate quantity of emulsifying medium, and having determined the quantity of water which may be used in forming an emulsion; for example, in work where 15% (300 lbs.) per ton of emulsion is specified; the next step of my method is to mix the required amount of emulsifying medium with a given weight of asphalt.

In accordance with this procedure, melted asphalt, is run into a mechanical, steam heated mixer or agitator, and immediately thereafter is introduced the emulsifying medium in a highly agitated state. The two substances are rapidly mixed therein under heated conditions, the mixing continuing for a few minutes. After which it may be discharged from the mixer and run through a colloid mill for more thorough mixing. The product may then be run into drums or tank cars ready for shipment.

The following is an example of relative weights and percentages, in producing the emulsifiable asphalt:—

|  |  | Per cent |
|---|---|---|
| Melted asphalt | 1940 lbs | 97 |
| Emulsifying medium | 60 lbs | 3 |
| Total of batch | 2000 lbs | 100 |

With the emulsifying medium containing 50% cut-back and 50% dispersing agent, it will be noted that, in accordance with the above formula, there will be 30 lbs. of dispersing agent This weight will carry 300 lbs. of water in the final emulsion.

In producing the emulsion from emulsifiable asphalt, the proceeding is extremely simple, for example:

Into a steam heated mechanical emulsifier is run

|  |  | Per cent |
|---|---|---|
| Emulsifiable asphalt | 1700 lbs | 85 |
| Hot water | 300 lbs | 15 |
| Total emulsion | 2000 lbs | 100 |

The mass is thoroughly mixed under heat, for a few minutes, and the emulsion is finished.

The resulting emulsion is uniform and reliable, much more so than emulsions formed by the agency of cooking and cooked aqueous carbohydrate pastes.

This emulsion must be used hot, as it is a liquid dispersion in a solid phase, when cool. It can however be remelted for use at any time. The emulsion is stable and there is no separation of water at any time.

It has been found that emulsions prepared in accordance with my invention have little or no tendency to ferment.

As a further example of my emulsifiable asphalt, in a cold liquid form, the weights and percentages are given as follows:

A sufficient quantity of crude asphalt is first cut back to a fluid state when cold, with approximately 30% by weight of naphtha or other suitable cut-back. Then, to 1940 pounds of this liquid asphalt is added 60 pounds of my emulsifying medium, and the mass thoroughly mixed. The mixing may be done while the mass is cold, or about 70° F., or it may be done under slightly higher temperature. This will depend largely upon the atmospheric temperature.

As in the former example, 1700 pounds of this emulsifiable asphalt, in the liquid condition, can be emulsified with three hundred pounds of water, either with or without the aid of heat, merely by proper mixing.

While the examples given, contemplate the use of 15% of water, it will be understood that other formulas contemplating varying percentages of water, as high as 75 or 80% to the ton, may be employed, and the emulsifiable asphalt prepared accordingly by increasing or diminishing the percentage of dispersing agent and cut-back in forming the emulsifying medium in the approximate ratio cited herein, the method of procedure in all cases being the same.

What I claim is:—

1. The method of producing an emulsifiable asphalt, which consists in mixing a carbohydrate-containing meal, of the class consisting of cereal meals and oleaginous seed meals, with a light hydrocarbon asphalt cut-back, in substantially equal proportions, to form a water-free emulsifying medium and then mixing a small amount of said medium with the asphalt in the liquid state.

2. The method of producing an emulsifiable asphalt, which consists in mixing a carbohydrate-containing meal, of the class consisting of cereal meals and oleaginous seed meals, with a light hydrocarbon asphalt cut-back, in substantially equal proportions, to form a water-free emulsifying medium and then mixing approximately three percent of said medium with the asphalt in the liquid state.

3. The method of producing an emulsifiable asphalt, which consists in mixing a carbohydrate-containing meal, of the class consisting of cereal meals and oleaginous seed meals, with a light petroleum naphtha asphalt cut-back, in substantially equal proportions, to form a water-free emulsifying medium, and then mixing a small amount of said medium with the asphalt in the liquid state.

CHARLES E. HITE.